United States Patent
Heiartz et al.

(10) Patent No.: US 7,004,296 B2
(45) Date of Patent: Feb. 28, 2006

(54) TORQUE TRANSMISSION SYSTEM FOR A VEHICLE

(75) Inventors: Markus Heiartz, Würzburg (DE); Sebastian Bindig, Gädheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/723,555

(22) Filed: Nov. 24, 2003

(65) Prior Publication Data

US 2004/0104089 A1 Jun. 3, 2004

(30) Foreign Application Priority Data

Nov. 27, 2002 (DE) ................. 102 55 215
Aug. 1, 2003 (DE) ................. 103 35 274

(51) Int. Cl.
*B60K 17/00* (2006.01)
(52) U.S. Cl. .................... 192/3.51; 180/65.2
(58) Field of Classification Search ............. 192/3.51, 192/3.57; 477/5, 6; 180/65.2–65.4, 65.6, 180/65.7
See application file for complete search history.

(56) References Cited

U.S. PATENT DOCUMENTS

| | | | | |
|---|---|---|---|---|
| 5,007,512 A | * | 4/1991 | Petzold | 192/3.51 |
| 5,193,634 A | * | 3/1993 | Masut | 180/65.2 |
| 5,875,691 A | * | 3/1999 | Hata et al. | 74/661 |
| 6,342,027 B1 | * | 1/2002 | Suzuki | 477/5 |
| 6,344,008 B1 | * | 2/2002 | Nagano et al. | 475/1 |
| 2002/0086764 A1 | * | 7/2002 | Ooyama | 475/214 |

FOREIGN PATENT DOCUMENTS

JP           01032937 A  *  2/1989

* cited by examiner

*Primary Examiner*—Richard M. Lorence
(74) *Attorney, Agent, or Firm*—Cohen, Pontani, Lieberman & Pavane (57) ABSTRACT

A torque transmission system for the transmission of torque between a prime mover and a gearbox in a vehicle includes an input shaft, which can rotate around a first axis of rotation; at least one output shaft, which can rotate around a second axis of rotation transversely offset from the first axis of rotation; and a first clutch arrangement with an output area, which is or can be connected nonrotatably to the output shaft, and an input area, which can be connected as desired to the output area for the transmission of torque. A drive arrangement connects the input shaft to the input area so that the input area can be caused to rotate by the input shaft.

12 Claims, 6 Drawing Sheets

TORQUE TRANSMISSION SYSTEM FOR A VEHICLE

BACKGROUND OF THE INVENTION

1. Field of the Invention

The present invention pertains to a torque transmission system for a vehicle for transmitting torque between a drive engine and a gearbox.

2. Description of the Related Art

In the drive systems used in motor vehicles, especially passenger vehicles, there are essentially two possible ways, depending on the size or type of vehicle, in which the prime mover and the gearbox arrangement can be installed. One of these possibilities is a longitudinal installation, in which the prime mover is installed so that its drive shaft is parallel to the longitudinal direction of the vehicle. The gearbox follows after the prime mover in the longitudinal direction of the vehicle; i.e., it is installed behind the prime mover. In smaller vehicles, however a second possibility is known, according to which the prime mover is installed so that its drive shaft is transverse to the longitudinal direction of the vehicle, and the gearbox is next to the prime mover in this transverse direction; that is, in relation to the longitudinal direction of the vehicle, the gearbox is positioned laterally adjacent to the prime mover. This design in particular quickly reaches certain limits because of the extremely limited amount of space available in the transverse direction of the vehicle; an arrangement of this type has been possible only in conjunction with comparatively small prime movers or prime movers which can be designed to be comparatively small in the direction of their drive shaft.

SUMMARY OF THE INVENTION

The object of the present invention is to provide a torque transmission system or a drive system for a vehicle that makes it possible for better use to be made of the available space.

According to a first aspect of the present invention, this object is achieved by a torque transmission system for a vehicle for transmitting torque between a prime mover and a gearbox, including an input shaft, which can rotate around a first axis of rotation; at least one output shaft, which can rotate around a second axis of rotation transversely offset from the first axis of rotation; and a first clutch arrangement with an output area, which is or can be connected nonrotatably to the output shaft, and an input area, which can be connected as desired to the output area for the transmission of torque, which input area can be caused to rotate by the input shaft, acting by way of a drive arrangement.

As a result of this torque transmission system according to the invention, it is possible for the prime mover and the gearbox to be laterally offset from each other—relative to the axes of rotation of the shafts to be connected. It is therefore also possible for these two system components, i.e., the prime mover and the gearbox arrangement, to overlap each other in this axial direction. The result is that the size of the overall unit in the axial direction is reduced.

So that a drive torque can be easily transmitted between the input shaft and the input area of the first clutch arrangement, it is proposed that the drive arrangement have a first drive wheel, which is or can be connected to the input shaft for rotation in common, and a second drive wheel, which can be driven by the first drive wheel for rotation in common and which is connected nonrotatably to the input area of the first clutch arrangement. It is possible here, for example, for the first drive wheel to be connected to the second drive wheel by an endless belt so that it can drive the second wheel.

According to another advantageous aspect, the rotor arrangement of an electrical machine can be connected nonrotatably to the first drive wheel, where the stator arrangement of the electrical machine is supported on a stationary assembly. An electrical machine of this type can be used both to start the prime mover and to supply electrical energy to the on-board electrical system while the prime mover is in operation. If controlled appropriately, it can also serve as a vibration-damping system. Another expansion of the range of uses an electrical machine of this type can be achieved by designing the rotor arrangement so that, if desired, it can be connected together with the first drive wheel by a second clutch arrangement to the input shaft for rotation in common. By the use of a second clutch arrangement, which in general can be called an "impulse starting clutch", it becomes possible to use a comparatively small electrical machine to start a comparatively large prime mover. For this purpose, the rotor arrangement, together with all of the components connected to it for rotation in common, is first accelerated to a certain rotational speed and then, once a specific rotational speed has been reached and thus a certain mass moment of inertia is present in this rotating system, the second clutch arrangement is very quickly moved in the engaging direction, with the result that the drag torque present in the machine rotates the prime mover. It is especially advantageous here for the rotor arrangement also to be nonrotatably connected by way of the first drive wheel and the second drive wheel to the input area of the first clutch arrangement, the essential functions of which are then to get the vehicle moving and to participate in gearshift operations. To this extent, all of the rotating components of the input area of this first clutch arrangement can also be used to store rotational energy, which is then available to start the prime mover, i.e., to get it turning.

When an electrical machine is part of the system, a design that makes very efficient use of the space available in the axial direction can be obtained by installing the electrical machine so that it is essentially coaxial to the first axis of rotation and essentially laterally adjacent to the first clutch arrangement. So that the occurrence of tilting moment can be avoided during the transmission of torque from the drive arrangement to the input area of the first clutch arrangement, it is proposed that, in relation to the second axis of rotation, the input area of the first clutch arrangement be supported symmetrically with respect to the axial area in which the second drive wheel is working. It is possible, for example, for the input area of the first clutch arrangement to be supported in the axial area in which the second drive wheel is working.

According to an another advantageous aspect, very easy-to-realize access to the first clutch arrangement for the implementation of clutch-engaging and clutch-releasing operations can be achieved by locating the actuating system of the first clutch arrangement after the output shaft, i.e., following after it in the direction of the second axis of rotation. Alternatively, however, is also possible for the actuating system of the second clutch arrangement to surround the output shaft. This design offers the special advantage that the actuating system overlaps the output shaft axially and thus essentially no additional axial space is required for the actuating system.

According to a second aspect of the present invention, the task indicated above is accomplished by a drive system for a vehicle, comprising a prime mover with a drive shaft and a gearbox arrangement with at least one gearbox input shaft, where the gearbox input shaft of the gearbox arrangement is laterally offset from the axis of rotation of the drive shaft of the prime mover.

In an arrangement of this type, it is preferable for the gearbox arrangement to be laterally adjacent to the prime mover, so that an axial overlap can be obtained between the gearbox arrangement and the prime mover.

In a drive system of this type, a torque transmission system according to the invention is preferably used to transmit torque between the drive shaft of the prime mover as the input shaft and the gearbox input shaft as the output shaft.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
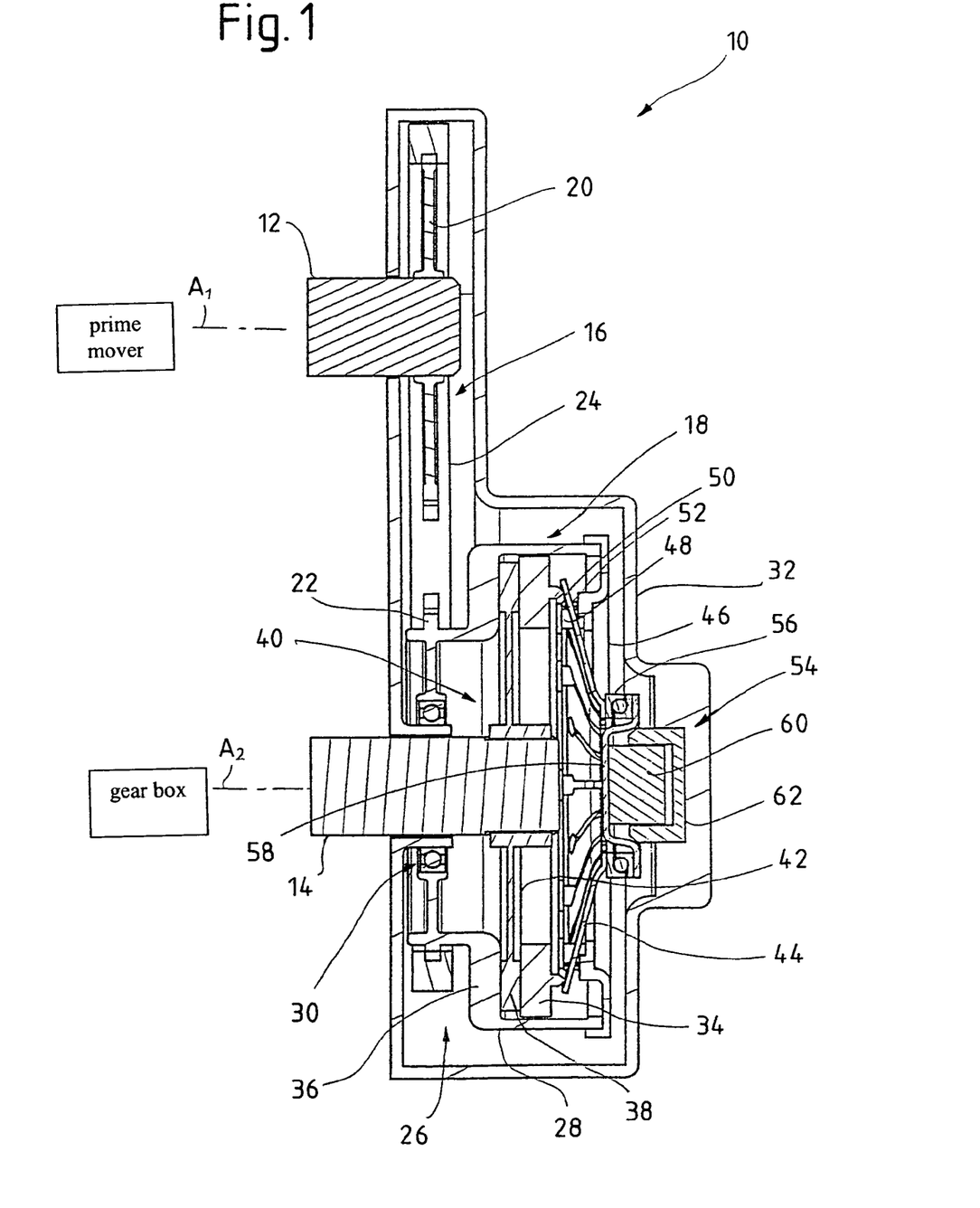
FIG. 1 shows a longitudinal cross section of a torque transmission system according to a first embodiment of the invention.
Figure 2:
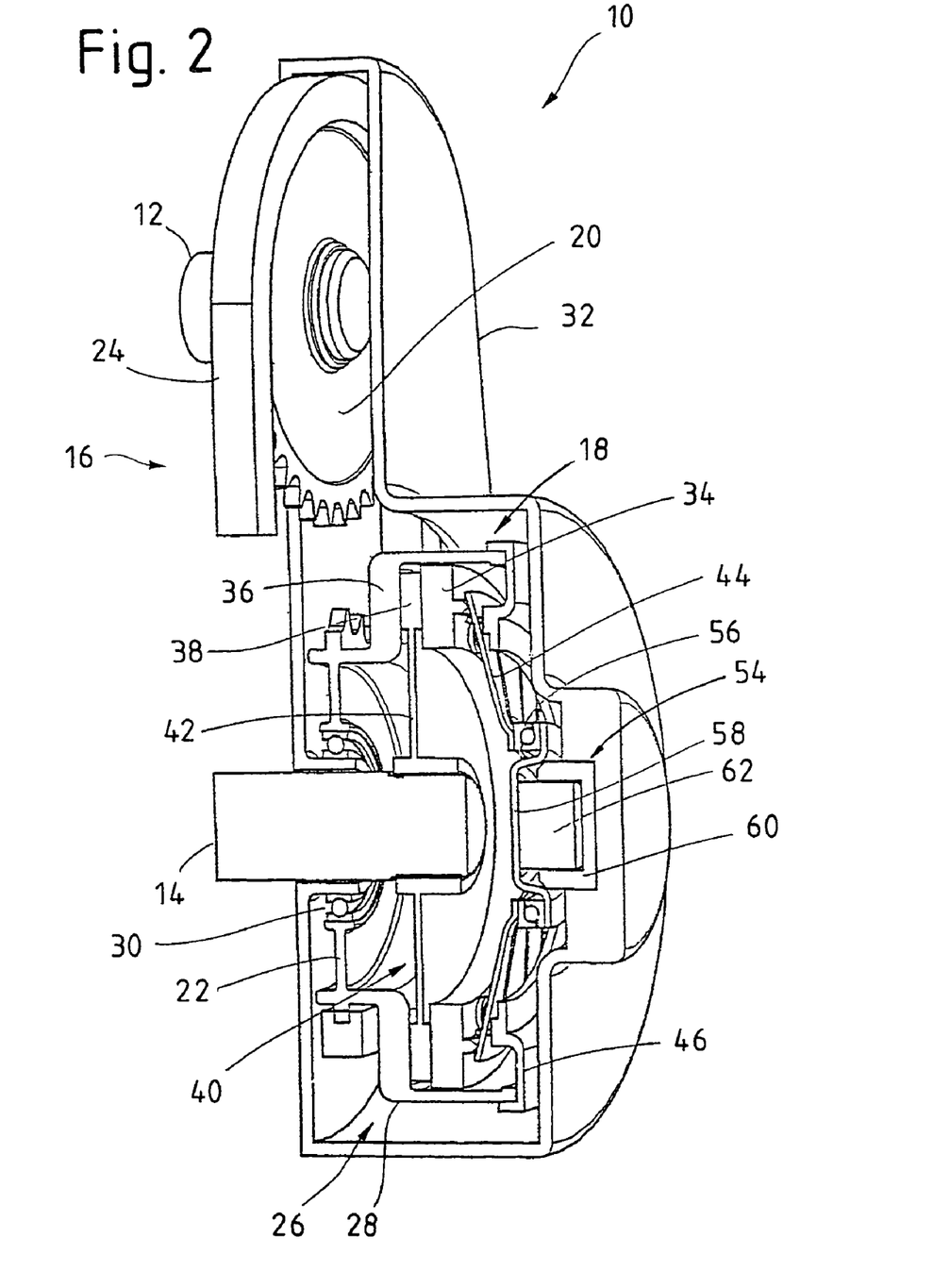
FIG. 2 shows a perspective view of the system according to FIG. 1.

FIGS. 1 and 2 show a torque transmission system 10 for the drivetrain of a motor vehicle. This torque transmission system 10 serves to transfer the torque generated by a prime mover to a gearbox arrangement. A drive shaft of the prime mover, e.g., a crankshaft, acts as the input shaft 12 of the torque transmission system, whereas a transmission input shaft acts as the output shaft 14 of the torque transmission system 10. Whereas the input shaft 12 is able to rotate around an axis of rotation $A_1$, the output shaft 14 is able to rotate around an axis of rotation $A_2$, which can be parallel, for example, to the first axis of rotation $A_1$, but which is offset transversely or laterally from it. The result of this displacement is that the two shafts 12, 14 are also laterally offset from each other and can extend next to each other within the same axial area, so that, in the case of the arrangement shown in FIG. 1, both the prime mover and the gearbox would be positioned next to each other on the left side of the diagram.

So that torque can be transmitted from the input shaft 12, i.e., the drive shaft of the prime mover, to the output shaft 14, i.e., to the gearbox input shaft, essentially two system areas are present in the torque transmission system 10 shown in FIGS. 1 and 2. This first area is a drive arrangement designated 16, and the second is a clutch arrangement designated 18 overall.

The drive arrangement 16 comprises a first drive gear wheel 20, which is nonrotatably connected by Hirth-type serrations, by groove or channel toothing, by spur toothing, or in some other way to the input shaft 12 and is thus able to rotate with this shaft around the axis of rotation $A_1$. A second drive gear wheel 22 is also provided. Relative to the two axes of rotation $A_1$ and $A_2$, this second wheel is located axially in the same area as the first drive gear wheel 20. The first drive gear wheel 20 is connected to the second drive gear wheel 22 by an endless belt 24, so that the first drive gear wheel 20 can drive the second drive gear wheel 22. The endless belt 24 can be a toothed belt or a chain. Of course, it is also possible to use here a conventional V-belt, but the wheels 20 and 22 would have to be designed to accommodate such a belt. Because the endless belt 24 has a certain intrinsic elasticity, a certain vibration-damping function is already integrated into the route by which the torque is transmitted between the two shafts 12, 14. It is also possible to design the wheel 20 or to connect the wheel 20 to the shaft 12 in such a way that a certain elasticity with respect to wobbling movements is provided, so that a tilt angle which may be present here between the axes of rotation $A_1$ and $A_2$ as a result of manufacturing tolerances can be compensated. It is also obvious that a torsional vibration damper arrangement could be integrated into the wheel 20, such as an arrangement similar to that used for dual-mass flywheels.

The clutch arrangement 18 comprises an input area 26 which is driven in rotation by the drive arrangement 16 upon rotation of the input shaft 12. This input area 26 comprises in turn essentially a pot-like housing 28, a certain axial area of which is permanently connected to the wheel 22; in the example show here, the housing is designed as an integral part of that wheel. In this axial area, where the housing 28 or the wheel 22 extends radially inward, the input area 26 is supported rotatably by a bearing 30 on an external housing 32 completely enclosing the torque transmission system 10 or on some other type of permanent assembly. This ensures that the support is symmetrical in the area where the drive force or the drive torque is introduced to the input area 26 of the clutch arrangement 18, which means that the occurrence of tilting moment can be avoided.

In the pot-like housing 28 of the clutch arrangement 18, there is also a pressure plate 34, which is connected to the housing 28 in the conventional manner by tangential leaf springs or the like for rotation in common around the axis of rotation $A_2$, but with a certain freedom of movement in the direction parallel to this axis of rotation $A_2$. The friction linings 38 of a clutch disk 42, providing what amounts essentially to the output area 40 of the clutch arrangement 18, are located between the pressure plate 34 and a bottom area 36 of the housing 28, which forms an abutment. This clutch disk 42 is then connected nonrotatably by V-shaped teeth or the like, but still with a certain freedom of axial movement to the output shaft 14. It should also be pointed out here that this clutch disk 42 could obviously be designed with a torsional vibration damper arrangement.

An energy storage device 44, designed as a diaphragm spring in the present example, is supported against the pressure plate 34 on one side and against a housing cover 46 permanently connected to the housing 28 on the other. The energy storage device can be supported on a knife-edged area of the pressure plate 34, known in and of itself, or by a wear take-up device, also known in and of itself. In the case of a clutch arrangement of the push type shown here, the energy storage device 44 is carried on, and supported against, the housing cover 46 by spacer bolts 48 and wire rings 50, 52, which are located radially inside the area where the energy storage device is supported on the pressure plate 34.

An actuating system 54 is provided to actuate the clutch arrangement 18. This system comprises a rotational disconnect bearing 56, on which a piston element 60 can press by way of an actuating cup 58; this piston element can move in the direction parallel to the axis of rotation $A_2$ inside an axially stationary cylinder 62 under the action of a pressurized fluid, which is either supplied or discharged as appropriate. It can be seen that the actuating system 54 is located axially adjacent to the end of the output shaft 14 which is connected to the clutch disk 42, so that here a very simple design of the actuating system 54 is possible, in which the cylinder 62 can be supported axially against the external housing 32.

To disengage the clutch arrangement 18 so that shifting can occur from one gear to another, for example, fluid is supplied to the cylinder 62 to push the piston element 60 together with the actuating cup 58 toward the output shaft 14, so that, under corresponding pivoting or deformation of the energy storage device 44, the actuating effect on the pressure plate 34 can be nullified or reduced. The force exerted by the pressure plate on the clutch disk 42 changes accordingly.

By means of the torque transmission system 10 shown in FIGS. 1 and 2, it becomes possible to install the prime mover and the gearbox to be connected to it for the transmission of torque next to each other in the drive system of the vehicle. In drive systems that are installed transversely to the longitudinal direction of the vehicle, this can considerably reduce the amount of space required in the transverse direction. The use of the drive arrangement 16 also makes it possible to perform a speed conversion even before the torque is transmitted to the output shaft 14, i.e., to the gearbox input shaft. Depending on the area of application, the speed can be either increased or decreased. Another essential advantage of the present invention is that an output area 40 of the clutch arrangement 18 which has comparatively little mass and thus a correspondingly small mass moment of inertia is connected to the output shaft 14, which acts as the gearbox input shaft. This makes it easier for the gears in the gearbox to be synchronized for the execution of gear-shifting operations.

It is obvious that the embodiment of the torque transmission system 10 shown in FIGS. 1 and 2, as well as the embodiments to be described below with reference to FIGS. 3–6, can be modified in various ways. For example, it is possible for the clutch arrangement 18 to be designed as a multi-disk clutch, in which several clutch disks or similar arrangements or possibly even a series of plates are connected nonrotatably to the output shaft 14, as a result of which the overall active frictional surface area can be considerably increased. It is also obvious that the clutch arrangement 18 can be designed as a dual clutch arrangement. Each of the two clutch areas of this type of dual clutch has, in its own output area, a clutch disk or the like, which is then connected nonrotatably to one of the two output shafts or gearbox input shafts, which are usually coaxial to each other. Both a dual clutch and a multi-disk clutch occupy more axial space than the simple clutch with one clutch disk shown in FIG. 1. Because the gearbox and the prime mover are next to each other, however, some extra axial space becomes free, which can then be used to accommodate this type of clutch arrangement with its greater axial length. It is possible in many cases, but especially when a dual clutch is used, to design a clutch area or several clutch areas as so-called normally-open clutches, in which the actuating system does not produce a clutch-releasing force acting in opposition to the energy storage device, but rather an engaging force, which is transmitted to the pressure plate by way of a force-exerting arrangement, which can also be designed in the form of a diaphragm spring or which can comprise several transfer lever elements.

An alternative embodiment of a torque transmission system according to the invention is described below on the basis of FIGS. 3 and 5. Components which correspond to those described above with respect to design and/or function have been designated by the same reference numbers, to which an "a" has been appended. Because the basic design is the same as that described above, only the differences with respect to the embodiment according to FIGS. 1 and 2 will be discussed. It can be seen, first, that, in the embodiment of the torque transmission system 10*a* according to FIGS. 3 and 4, an electrical machine 70*a* has also been provided. This electrical machine 70*a*, which can act as a starter-generator system, comprises a stator arrangement 72*a* which can be attached to the engine block, for example, or designed as a direct, integral part thereof. This stator arrangement can have the conventional stator windings on a stator yoke. A rotor arrangement 74*a* of the electrical machine 70*a* is supported rotatably with respect to the stator arrangement 72*a* by a bearing arrangement 76*a* and comprises a plurality of permanent magnets, serving as its rotor interaction area 78*a*, these magnets being arranged in a row proceeding in the circumferential direction around the axis of rotation $A_1$. The rotor arrangement 74*a* is nonrotatably connected to the first drive gear wheel 20*a*. In the case illustrated here, a rotor bracket 80*a* is designed, for example, as an integral part of the wheel 20*a* and simultaneously forms the area by which the rotor arrangement is supported on the stator arrangement 72*a* by the bearing arrangement 76*a*. Of course, it is also possible for the rotor arrangement 74*a* or its bracket 80*a* and the wheel 20*a* to be designed as separate parts, which are produced independently first and then connected to each other nonrotatably. The rotor arrangement 74*a* is connected together with the drive gear wheel 20*a* to the input shaft 12*a* in the manner described above for rotation in common.

Figure 3:
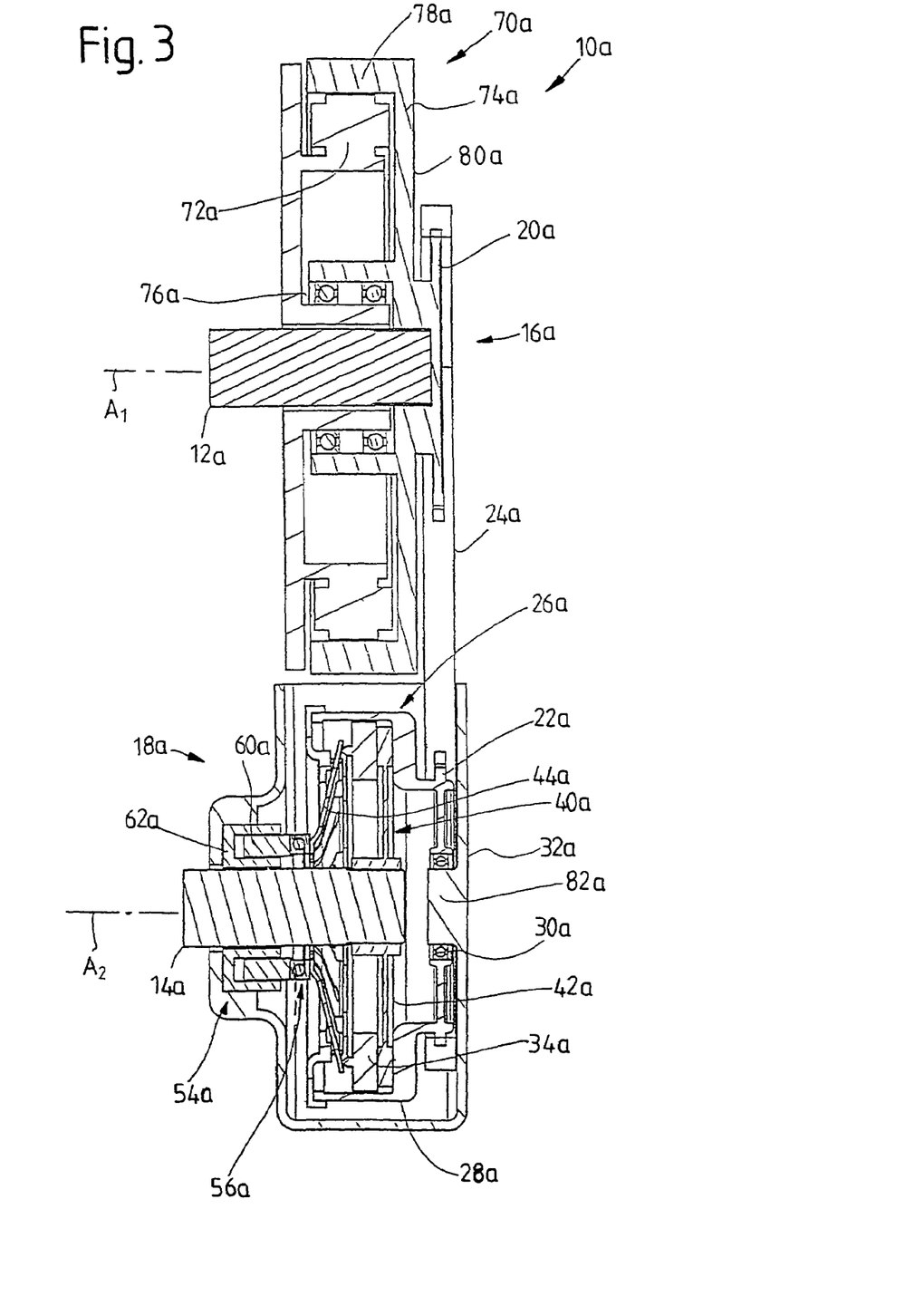
FIG. 3 shows a longitudinal cross section of a torque transmission system according to a second embodiment of the invention.
Figure 4:
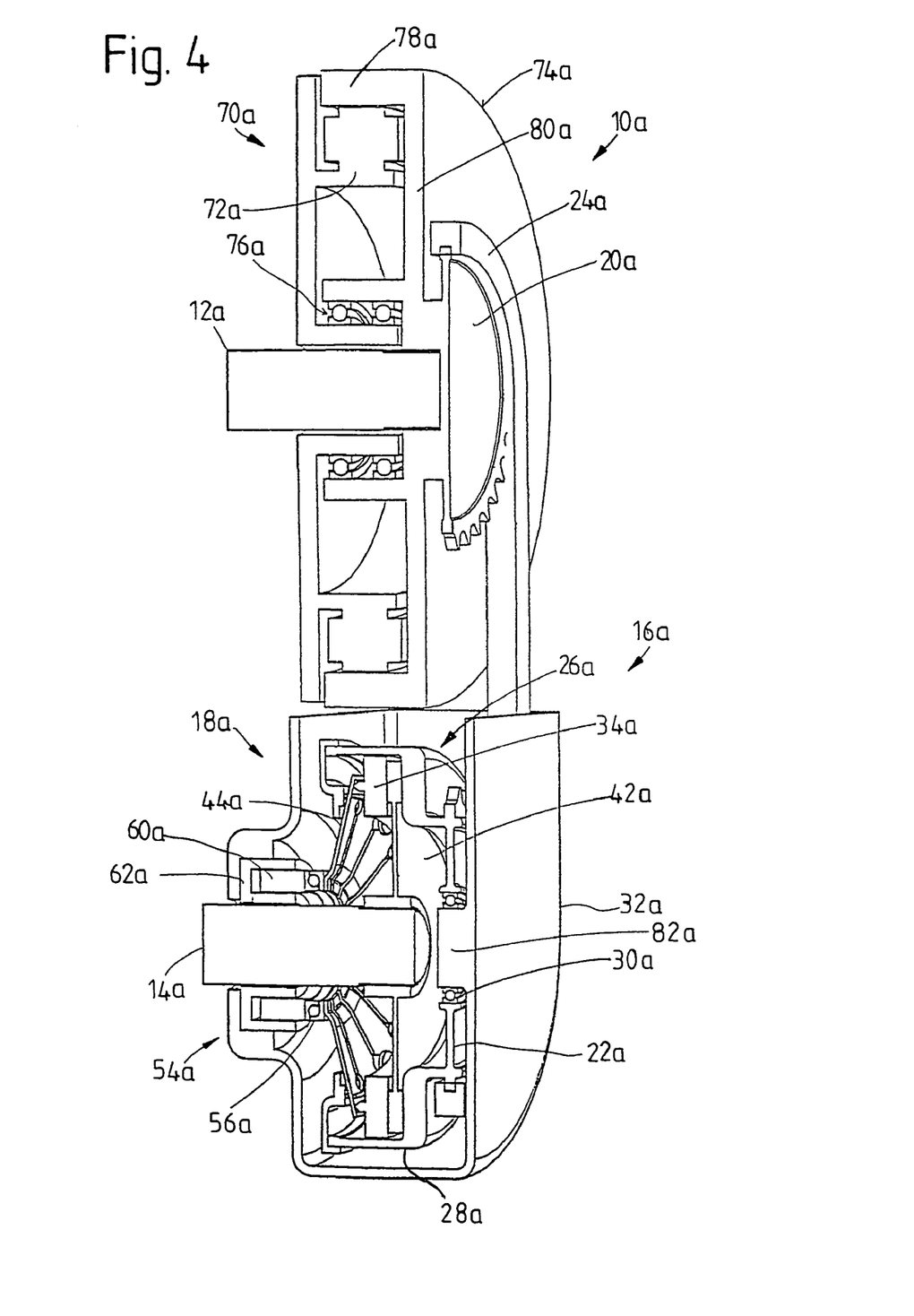
FIG. 4 shows a perspective view of the system according to FIG. 3.

The clutch arrangement 18*a* shown in FIGS. 3 and 4 is rotated 180° with respect to the installation situation shown in FIGS. 1 and 2. That is, the input area 26*a* is nonrotatably supported on the external housing 32*a* by the bearing 30*a* in the axial area of the drive gear wheel 22*a*, where the bearing 30*a* is centered on a bearing shoulder 82*a* of the external housing 32*a*, which bearing shoulder 82*a* follows axially after the end of the output shaft 14*a* and is concentric thereto. As a result of the reversal of the clutch arrangement 18*a*, the actuating system 54*a* is now positioned in the same axial area as that in which the output shaft 14*a* also extends. This can be made possible by, for example, designing both the piston element 60*a* and also the cylinder 62*a*, which can again be supported axially against the external housing 32*a*, as ring-shaped components, which surround the output shaft 14*a* concentrically with respect to the axis of rotation $A_2$. The piston element 60*a* now acts by way of the rotational disconnect bearing 56*a* directly on the energy storage device 44*a*.

In the embodiment shown in FIGS. 3 and 4, it becomes possible through the integration of the electrical machine 70*a* into the torque transmission system 10*a* for the two system areas, i.e., the electrical machine 70*a* and the clutch arrangement 18*a*, to be positioned in the same axial area relative to the axes of rotation $A_1$ and $A_2$, so that the axial space available can be used very efficiently here, too. As a result of the integration of the electrical machine 70a into the torque transmission system 10a, the function of starting the prime mover, if it is an internal combustion engine, the function of supplying electrical energy to the on-board electrical system while the prime mover is operating, and possibly the function of actively damping rotational vibrations will also be integrated into this system.

The positioning of the clutch arrangement 18a in the manner shown in FIGS. 3 and 4 offers the advantage that additional axial space can be saved as a result of the axially overlapping positioning of the actuating system 54a and the output shaft 14a.

Figure 5:
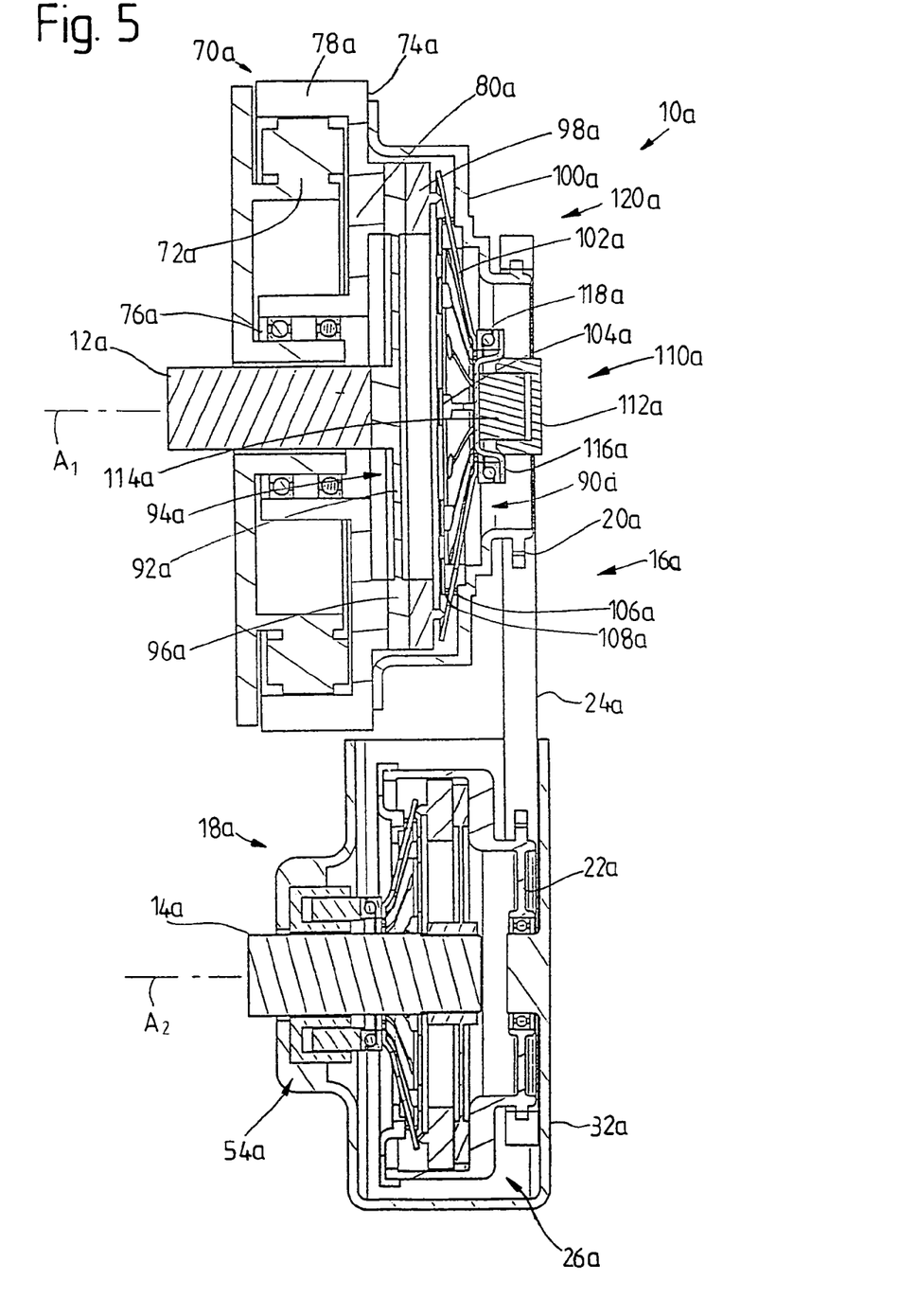
FIG. 5 shows a longitudinal cross section of a torque transmission system according to a third embodiment of the invention.
Figure 6:
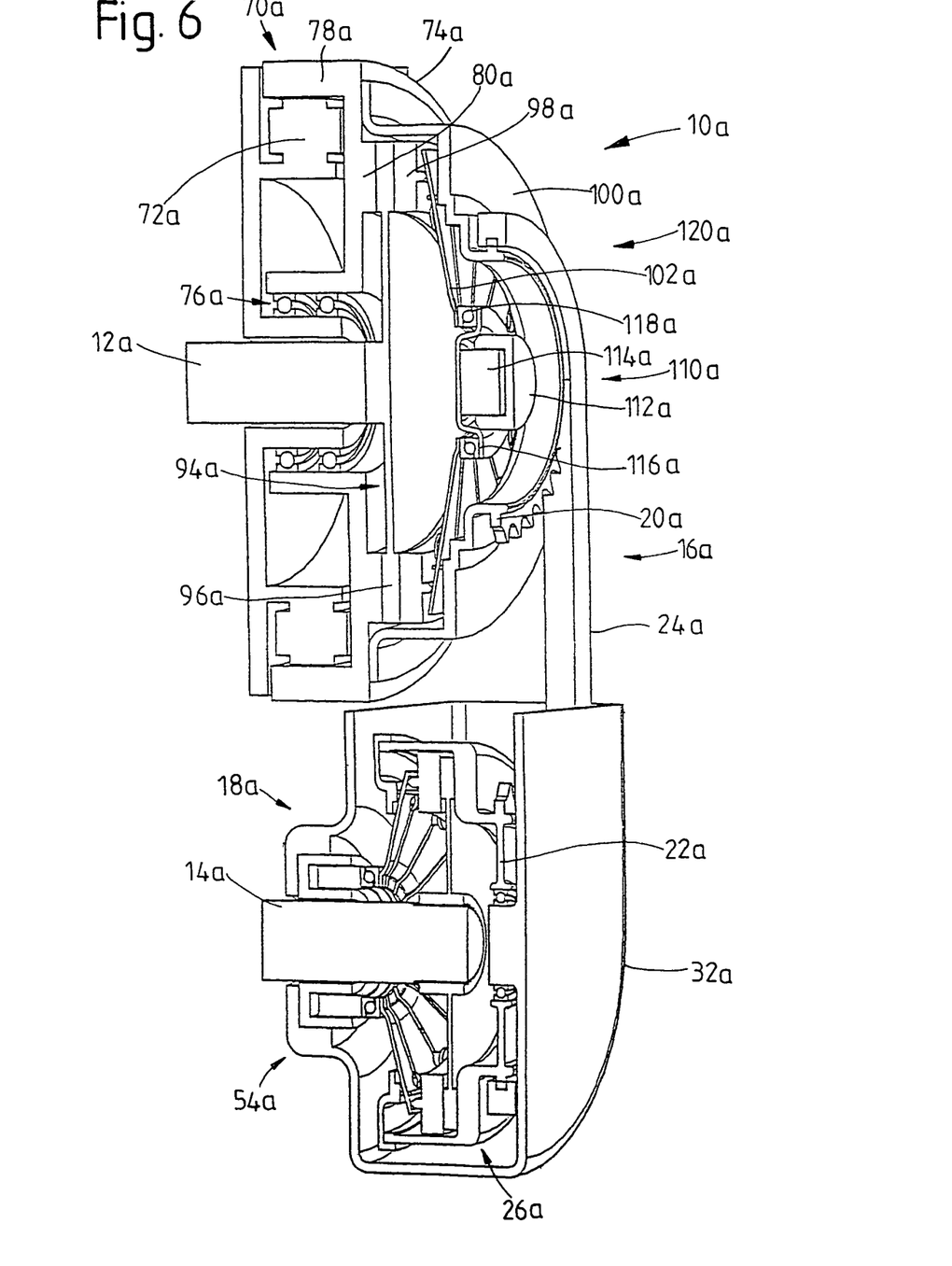
FIG. 6 shows a perspective view of the system according to FIG. 5.

FIGS. 5 and 6 show a modification of the embodiment shown in FIGS. 3 and 4. Here it can be seen that the rotor arrangement 74a together with the drive gear wheel 20a can be connected if desired by way of another clutch arrangement 90a to the input shaft 12a. A clutch disk 92a connected nonrotatably to the input shaft 12a forms here the input area 94a of this clutch arrangement 90a. The friction linings 96a of this clutch disk 92a are situated axially between the bracket 80a of the rotor arrangement 74a, which serves as an abutment, and a pressure plate 98a. A housing 100a of this additional clutch arrangement 90a, which housing can be designed as an integral part of the drive gear wheel 20a, for example, or possibly connected permanently and nonrotatably to it, is connected to the rotor bracket 80a, and the pressure plate 98a is connected by tangential leaf springs or the like to this housing 100a so that it cannot rotate but can shift in the axial direction with respect to the housing in the direction parallel to the axis of rotation $A_1$. An energy storage device 102a is again carried by spacer bolts 104a and wire rings 106a, 108a on the housing 100a, and its radially outer area exerts force on, for example, a knife-edged area of the pressure plate 98a or by way of a wear take-up device or the like. An actuating system 110a comprises a cylinder 112a, which is supported axially against a stationary assembly such as the external housing 32a again, only part of which is shown. A piston element 114a, which can be moved back and forth inside the cylinder in the direction parallel to the axis of rotation $A_1$ by the feed and discharge of a pressurized fluid, has an actuating cup 116a and a rotational disconnect bearing 118a which allow it to exert force on the energy storage device 102a.

The clutch arrangement 90a can be designed to act as a so-called "impulse starting clutch". To start the prime mover, this clutch is first brought into the disengaged state, in which the input area 94a and thus the input shaft 12a are not connected to the output area 120a for the transmission of the torque, this output area comprising essentially the housing 100a and all of the components connected nonrotatably to it. In this state, the electrical machine 70a is excited so that the rotor arrangement 74a of the machine is caused to rotate together with all of the components connected nonrotatably to it until a certain rotational speed has been reached. Thus a certain amount of kinetic energy is stored in the rotating system. Together with the rotor arrangement 74a, therefore, the entire input area 120a of the clutch arrangement 90a is caused to rotate, which also means that, via the endless belt 24a of the drive arrangement 16a, the entire input area 26a of the clutch arrangement 18a, acting as the gearshift clutch, is driven around the axis of rotation $A_2$. Here, therefore, a comparatively large mass moment of inertia is present overall, which, when the desired rotational speed has been reached, also represents a correspondingly large amount of rotational energy.

Once a certain limit speed has been reached, the clutch arrangement 90a is very quickly moved in the engaging direction, so that spontaneously the input shaft 12a is caused to rotate, and in this way the prime mover, designed as an internal combustion engine, is rotated as well.

So that this function as an "impulse starting clutch" can be fulfilled in optimum fashion, it is advantageous to use inorganic friction linings 96a on the clutch disk 92a of the clutch arrangement 90a. These types of linings wear down comparatively slowly and can be used to transmit high torques.

In the various embodiments of the torque transmission system described above, it therefore becomes possible to install a prime mover such as an internal combustion engine and a gearbox arrangement next to each other in such a way as to save space in the axial direction. Various system components such as clutch arrangements and an electrical machine acting as a starter-generator can also be arranged next to each other, so that the overall amount of space required can be reduced even more. Especially the aspect according to which the prime mover and the gearbox arrangement can be arranged next to each other to save axial space, however, is independent of where the clutch arrangement 18 is positioned, which does not necessarily have to be in the position shown in the embodiment according to FIG. 1. It would obviously be possible, without losing the advantage of saving axial space, to install the clutch arrangement 18 in the area of the input shaft 12, in which case the clutch disk 42 could be connected nonrotatably to the input shaft 12 and thus would form the input area, whereas the system area described above as the input area 26 in connection with FIGS. 1 and 2 would then act as the output area, which would be connected via the drive arrangement 16 to the output shaft 14 for rotation in common. Because the mass moment of inertia present in the area of the output shaft 14 is smaller in the embodiment shown in FIGS. 1 and 2 than in the case of the modified embodiment described above, this first embodiment is preferred so that the various gears can be synchronized more easily.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torque transmission system for transmitting torque between a prime mover and a gearbox in a vehicle, said system extending along a longitudinal axis and comprising:
   an input shaft coupled to the prime mover and rotatable about a first axis of rotation;
   at least one output shaft coupled to the gearbox and rotatable about a second axis of rotation which is transversely offset from the first axis of rotation, the input and at least one output shafts extending laterally from longitudinal axis in a same lateral direction so that the prime mover and the gearbox located next to one another;

a first clutch arrangement comprising an output area, which is fixed to said output shaft for rotation in common, and an input area, which can be connected as desired to said output area for transmission of torque; and a drive arrangement connecting said input shaft to said input area of said clutch.

2. The torque transmission system of claim 1 wherein said drive arrangement comprises a first drive wheel, which is connected to said input shaft for rotation in common;

a second drive wheel, which is connected to said input area of the first clutch arrangement for rotation in common; and means connecting said first and second drive wheels so that the first drive wheel can cause the second drive wheel to rotate.

3. The torque transmission system of claim 2, wherein said means connecting said first and second drive wheels comprises an endless belt.

4. The torque transmission system of claim 2, further comprising an electric machine, said electric machine comprising:

a rotor arrangement connected to the first drive wheel for rotation in common; and a stator arrangement supported on a stationary assembly.

5. The torque transmission system of claim 4, further comprising a second clutch arrangement which can connect the first drive wheel to the input shaft for rotation in common as desired.

6. The torque transmission system of claim 4, wherein the electric machine is essentially coaxial to the first axis of rotation essentially and is located essentially laterally next to the first clutch arrangement.

7. The torque transmission system of claim 2, wherein, relative to the second axis of rotation, the input area of the first clutch arrangement is supported symmetrically with respect to the second drive wheel.

8. The torque transmission system of claim 7, wherein the input area is supported in the axial area of the second drive wheel.

9. The torque transmission system of claim 1, further comprising an actuating system for said first clutch arrangement, said actuating system being arranged on said second axis of rotation after said output shaft.

10. The torque transmission system of claim 1, further comprising an actuating system for said first clutch arrangement, said actuating system being arranged coaxially with said second axis of rotation around said output shaft.

11. A drive system for a vehicle having a longitudinal axis, said drive system comprising:

a prime mover having a drive shaft which can rotate about a first axis of rotation; and a gearbox having a gearbox input shaft which can rotate about a second axis of rotation which is transversely offset from the first axis of rotation, the input and at least one output shafts extending laterally from the longitudinal axis in a same lateral direction so that the prime mover and the gearbox located next to one another.

12. The torque transmission system of claim 11, further comprising a torque transmission system for transmitting torque from said drive shaft to said input shaft, said torque transmission system comprising:

a first clutch arrangement comprising an output area, which is fixed to said input shaft of said gearbox for rotation in common, and an input area, which can be connected as desired to said output area for transmission of torque; and a drive arrangement connecting said drive shaft to said input area of said clutch.

* * * * *